US012652533B2

(12) United States Patent
Balmakhtar et al.

(10) Patent No.: US 12,652,533 B2
(45) Date of Patent: Jun. 9, 2026

(54) WIRELESS COMMUNICATION NETWORK AUTHENTICATION FOR A WIRELESS USER DEVICE THAT HAS A CIRCUITRY IDENTIFIER

(71) Applicant: T-MOBILE INNOVATIONS LLC, Overland Park, KS (US)

(72) Inventors: Marouane Balmakhtar, Fairfax, VA (US); Zheng Fang, McLean, VA (US); Shu Wang, Kingsland, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 347 days.

(21) Appl. No.: 17/900,929

(22) Filed: Sep. 1, 2022

(65) Prior Publication Data

US 2024/0080666 A1 Mar. 7, 2024

(51) Int. Cl.
*H04W 12/062* (2021.01)
*H04W 12/71* (2021.01)
*H04W 76/12* (2018.01)

(52) U.S. Cl.
CPC ......... *H04W 12/062* (2021.01); *H04W 12/71* (2021.01); *H04W 76/12* (2018.02)

(58) Field of Classification Search
CPC ... H04W 12/062; H04W 12/06; H04W 12/70; H04W 12/08; H04W 12/71–12/79; H04L 63/08
See application file for complete search history.

(56) References Cited

U.S. PATENT DOCUMENTS

| | | | |
|---|---|---|---|
| 7,450,554 B2 | 11/2008 | Zhang | |
| 7,975,140 B2 * | 7/2011 | Fedyk | H04L 63/065 |
| | | | 380/279 |
| 9,167,427 B2 | 10/2015 | Messana et al. | |
| 9,344,421 B1 * | 5/2016 | Chen | H04W 12/06 |

(Continued)

FOREIGN PATENT DOCUMENTS

| | | | | | |
|---|---|---|---|---|---|
| AU | 2015246170 B2 * | 4/2017 | | | G06Q 20/105 |
| CA | 2700358 C * | 4/2013 | | | H04L 63/0442 |

(Continued)

OTHER PUBLICATIONS

Knudsen, L. R., Mitchell, C. J. "Analysis of 3gpp-MAC and two-key 3gpp-MAC". Elsevier, Discrete Applied Mathematics, vol. 128, Issue 1, pp. 181-191, May 15, 2003. (Year: 2003).*

*Primary Examiner* — Hadi S Armouche

(57) ABSTRACT

A wireless communication network authenticates a wireless user device. Access circuitry decrypts access data with a network key and identifies a network ID and circuitry ID in the decrypted access data. In response, the access circuitry establishes a secure tunnel with the user device and transfers the circuitry ID to authentication circuitry. The authentication circuitry identifies a user ID based on the circuitry ID and authenticates the user device based on the user ID. The authentication circuitry generates a new network key pair and transfers the new keys and a grant to the access circuitry. The access circuitry transfers a new network key and the grant to the user device over the secure tunnel. The user device unlocks a user key with the grant and securely communicates using the user key. The wireless user device uses the new network key for the next authentication.

20 Claims, 10 Drawing Sheets

(56) References Cited

U.S. PATENT DOCUMENTS

| | | | |
|---|---|---|---|
| 9,363,736 B2 | 6/2016 | Griot et al. | |
| 9,717,003 B2 | 7/2017 | Lee et al. | |
| 9,825,937 B2 | 11/2017 | Ahmavaara et al. | |
| 9,906,528 B2 | 2/2018 | Laitinen et al. | |
| 9,913,236 B2 | 3/2018 | Allen et al. | |
| 10,038,692 B2 | 7/2018 | Choyi et al. | |
| 10,172,058 B1 * | 1/2019 | Malhotra | H04W 36/0011 |
| 10,278,226 B2 * | 4/2019 | Bhatnagar | H04W 84/045 |
| 10,750,366 B1 * | 8/2020 | Gundavelli | H04W 12/069 |
| 10,873,464 B2 | 12/2020 | Muhanna et al. | |
| 10,904,751 B2 | 1/2021 | Abdulrahiman et al. | |
| 10,932,132 B1 * | 2/2021 | Gundavelli | H04W 12/106 |
| 10,992,670 B1 * | 4/2021 | Drooger | H04L 63/0428 |
| 2006/0019635 A1 * | 1/2006 | Ollila | H04L 63/08 |
| | | | 455/410 |
| 2007/0038853 A1 * | 2/2007 | Day | H04L 63/0281 |
| | | | 713/153 |
| 2008/0260149 A1 * | 10/2008 | Gehrmann | G06Q 20/3821 |
| | | | 380/247 |
| 2011/0252230 A1 * | 10/2011 | Segre | H04L 63/162 |
| | | | 713/171 |
| 2014/0273958 A1 * | 9/2014 | Messana | H04L 63/0892 |
| | | | 455/411 |
| 2015/0341792 A1 * | 11/2015 | Walsh | H04W 12/08 |
| | | | 713/176 |
| 2016/0072775 A1 * | 3/2016 | Choi | H04L 63/061 |
| | | | 713/171 |
| 2017/0006571 A1 * | 1/2017 | Allen | H04W 60/005 |
| 2017/0374063 A1 * | 12/2017 | Wimböck | H04W 12/04 |
| 2017/0374551 A1 * | 12/2017 | Shen | H04L 9/40 |
| 2018/0013568 A1 * | 1/2018 | Muhanna | H04L 9/0822 |
| 2018/0123794 A1 * | 5/2018 | Goranov | H04L 9/30 |
| 2018/0338242 A1 * | 11/2018 | Li | H04W 12/041 |
| 2020/0015079 A1 * | 1/2020 | Li | H04W 8/08 |
| 2021/0226780 A1 * | 7/2021 | Racz | H04L 9/30 |
| 2024/0298174 A1 * | 9/2024 | Rajadurai | H04W 12/06 |
| 2025/0097708 A1 * | 3/2025 | Al Accad | H04W 12/63 |

FOREIGN PATENT DOCUMENTS

| | | | | |
|---|---|---|---|---|
| EP | 3328108 A1 * | 5/2018 | ......... | H04L 63/0823 |
| WO | WO-2016015750 A1 * | 2/2016 | ......... | H04L 12/4633 |
| WO | WO-2020034334 A1 * | 2/2020 | | |
| WO | WO-2022028259 A1 * | 2/2022 | | |
| WO | WO-2022146034 A1 * | 7/2022 | | |

* cited by examiner

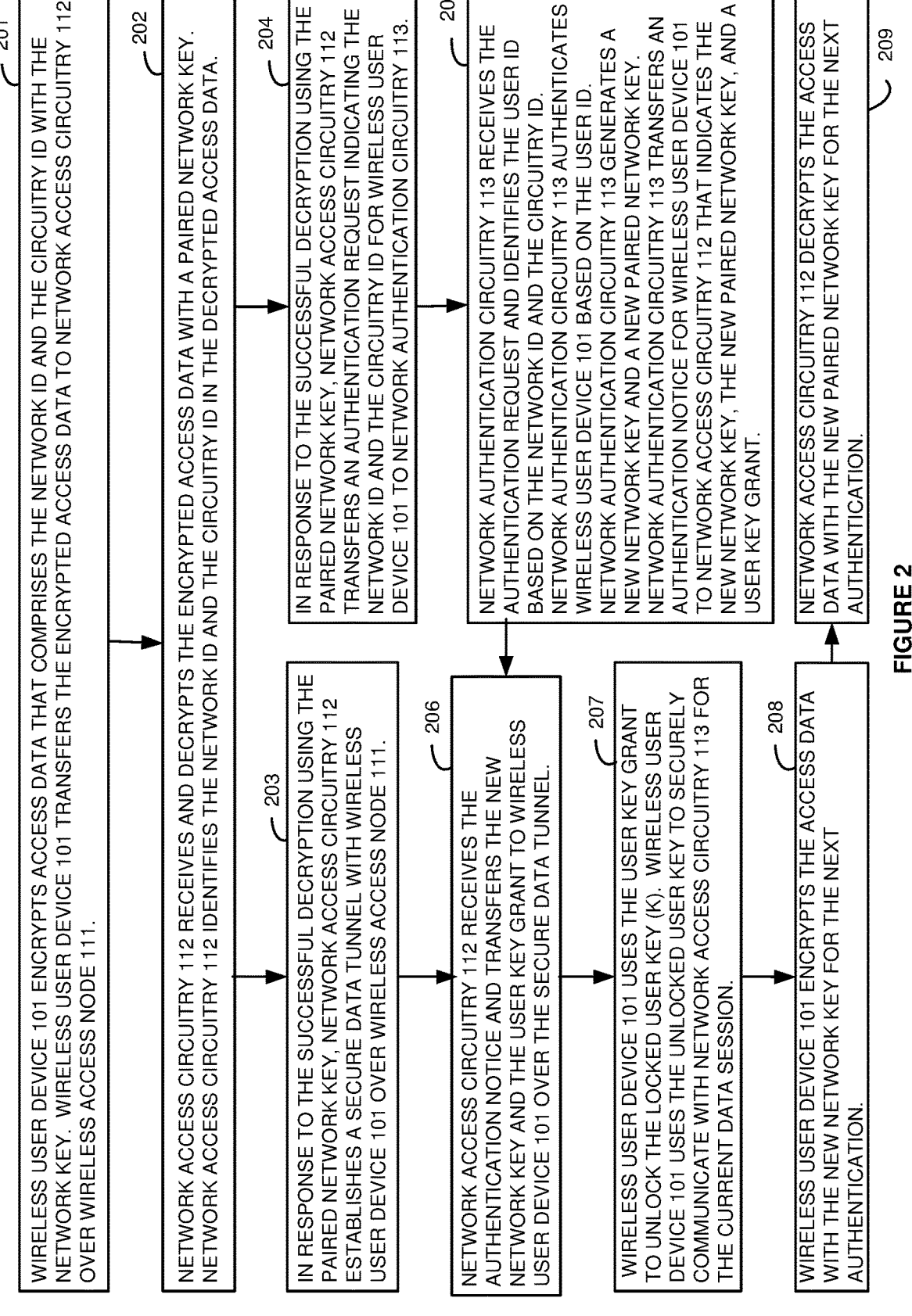

201 WIRELESS USER DEVICE 101 ENCRYPTS ACCESS DATA THAT COMPRISES THE NETWORK ID AND THE CIRCUITRY ID WITH THE NETWORK KEY. WIRELESS USER DEVICE 101 TRANSFERS THE ENCRYPTED ACCESS DATA TO NETWORK ACCESS CIRCUITRY 112 OVER WIRELESS ACCESS NODE 111.

202 NETWORK ACCESS CIRCUITRY 112 RECEIVES AND DECRYPTS THE ENCRYPTED ACCESS DATA WITH A PAIRED NETWORK KEY. NETWORK ACCESS CIRCUITRY 112 IDENTIFIES THE NETWORK ID AND THE CIRCUITRY ID IN THE DECRYPTED ACCESS DATA.

203 IN RESPONSE TO THE SUCCESSFUL DECRYPTION USING THE PAIRED NETWORK KEY, NETWORK ACCESS CIRCUITRY 112 ESTABLISHES A SECURE DATA TUNNEL WITH WIRELESS USER DEVICE 101 OVER WIRELESS ACCESS NODE 111.

204 IN RESPONSE TO THE SUCCESSFUL DECRYPTION USING THE PAIRED NETWORK KEY, NETWORK ACCESS CIRCUITRY 112 TRANSFERS AN AUTHENTICATION REQUEST INDICATING THE NETWORK ID AND THE CIRCUITRY ID FOR WIRELESS USER DEVICE 101 TO NETWORK AUTHENTICATION CIRCUITRY 113.

205 NETWORK AUTHENTICATION CIRCUITRY 113 RECEIVES THE AUTHENTICATION REQUEST AND IDENTIFIES THE USER ID BASED ON THE NETWORK ID AND THE CIRCUITRY ID. NETWORK AUTHENTICATION CIRCUITRY 113 AUTHENTICATES WIRELESS USER DEVICE 101 BASED ON THE USER ID. NETWORK AUTHENTICATION CIRCUITRY 113 GENERATES A NEW NETWORK KEY AND A NEW PAIRED NETWORK KEY. NETWORK AUTHENTICATION CIRCUITRY 113 TRANSFERS AN AUTHENTICATION NOTICE FOR WIRELESS USER DEVICE 101 TO NETWORK ACCESS CIRCUITRY 112 THAT INDICATES THE NEW NETWORK KEY, THE NEW PAIRED NETWORK KEY, AND A USER KEY GRANT.

206 NETWORK ACCESS CIRCUITRY 112 RECEIVES THE AUTHENTICATION NOTICE AND TRANSFERS THE NEW NETWORK KEY AND THE USER KEY GRANT TO WIRELESS USER DEVICE 101 OVER THE SECURE DATA TUNNEL.

207 WIRELESS USER DEVICE 101 USES THE USER KEY GRANT TO UNLOCK THE LOCKED USER KEY (K). WIRELESS USER DEVICE 101 USES THE UNLOCKED USER KEY TO SECURELY COMMUNICATE WITH NETWORK ACCESS CIRCUITRY 113 FOR THE CURRENT DATA SESSION.

208 WIRELESS USER DEVICE 101 ENCRYPTS THE ACCESS DATA WITH THE NEW NETWORK KEY FOR THE NEXT AUTHENTICATION.

209 NETWORK ACCESS CIRCUITRY 112 DECRYPTS THE ACCESS DATA WITH THE NEW PAIRED NETWORK KEY FOR THE NEXT AUTHENTICATION.

FIGURE 2

WIRELESS COMMUNICATION NETWORK AUTHENTICATION FOR A WIRELESS USER DEVICE THAT HAS A CIRCUITRY IDENTIFIER

TECHNICAL BACKGROUND

A wireless communication network provides wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over the wireless communication network. In another example, a sensor may take atmospheric readings and report the readings to a remote server over the wireless communication network.

The wireless communication network has wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Low-Power Wide Area Network (LP-WAN), Near-Field Communications (NFC), and the like. The wireless access nodes exchange network signaling and user data with network elements that are often clustered together into wireless network cores. The wireless network elements comprise Access and Mobility Management Functions (AMFs), Interworking Functions (IWFs), Application Functions (AFs), User Plane Functions (UPFs), and the like.

Before delivering a wireless data service to a wireless user device, the wireless communication network authenticates the wireless user device to determine user identity and status. The wireless user device stores a Subscriber Permanent Identifier (SUPI) in association with a long-term key (K). The wireless user device typically stores the long-term key and the SUPI in a Subscriber Identity Module (SIM). The wireless communication network also stores the SUPI in association with the long term key (K). The wireless communication network and the wireless user device derive several other keys from the long-term key (K). These derived keys are used by the wireless user device and the wireless communication network for authentication, encryption, and integrity protection.

To get authenticated, the wireless user device encrypts its SUPI into a Subscriber Concealed Identifier (SUCI) with a public key for the wireless communication network. The wireless user device transfers the SUCI to the wireless communication network. The wireless communication network decrypts the SUCI into the SUPI with a private key for the wireless communication network. This private network key is paired with the public key that was used by the wireless user device to conceal the SUPI. This public/private user key pair may be updated by using Over-the-Air (OTA) provisioning.

The wireless communication network uses the SUPI to retrieve the long-term key (K) for the wireless user device from a network database like a Uniform Data Repository (UDR). The wireless communication network hashes some of the derived keys with a random number and challenges the wireless user device with the random number. The wireless user device hashes its own derived keys with the same random number and responds to the challenge with a hash result. The wireless communication network authenticates the wireless user device when the network-calculated hash result matches the device-calculated hash result for the same random number. The wireless communication network and the wireless user device use some of the derived keys to implement cryptography and integrity protection. The wireless communication network delivers wireless data services to the wireless user device that are associated with the SUPI like internet-access and media-conferencing. The wireless communication network charges the SUPI for the network usage by the wireless user device.

Unfortunately, SIM-based authentication is too expensive for some types of wireless user devices like simple sensors. Moreover, other forms user authentication like passwords, certificates, and two-factor authentication are not efficiently and effectively integrated into the wireless communication network.

Technical Overview

A wireless communication network authenticates a wireless user device. Access circuitry receives and decrypts access data with a network key. The access circuitry identifies a network ID and circuitry ID in the decrypted access data. In response, the access circuitry establishes a secure tunnel with the wireless user device and transfers the circuitry ID to authentication circuitry. The authentication circuitry identifies a user ID based on the circuitry ID and authenticates the wireless user device based on the user ID. The authentication circuitry generates a new network key pair and transfers the new network keys and a user key grant to the access circuitry. The access circuitry transfers one of the new network keys and the user key grant to the wireless user device over the secure tunnel. The wireless user device unlocks the user key with the user key grant. The wireless user device securely communicates with the wireless communication network using the user key. The wireless user device uses the new network key to encrypt the access data for the next authentication.

DESCRIPTION OF THE DRAWINGS

FIG. 2 illustrates an exemplary operation of the wireless communication network to authenticate the wireless user device that has the circuitry ID.

DETAILED DESCRIPTION

Figure 1:
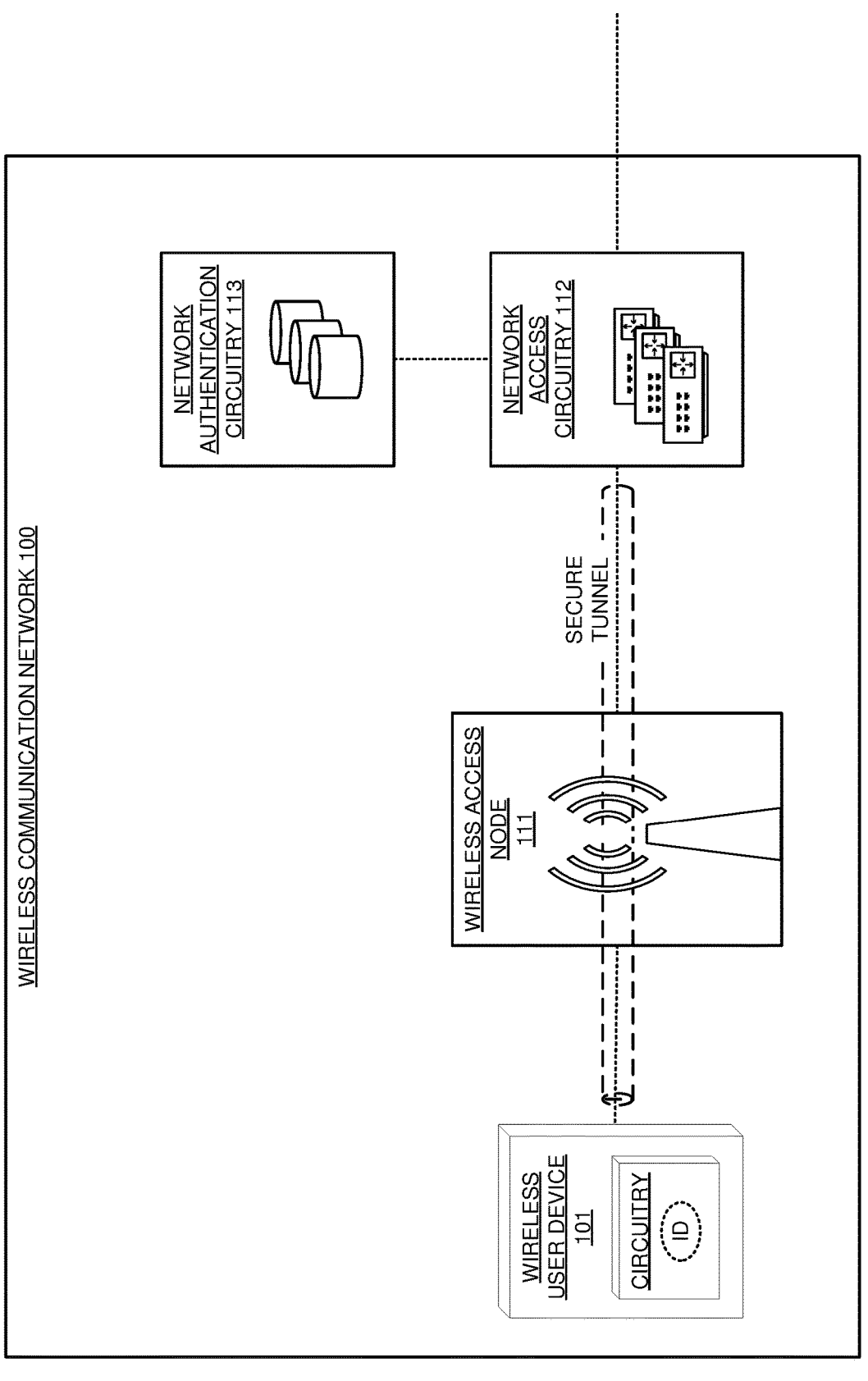
FIG. 1 illustrates an exemplary wireless communication network to authenticate a wireless user device that has a circuitry Identifier (ID).

FIG. 1 illustrates exemplary wireless communication network 100 to authenticate wireless user device 101 that has a circuitry Identifier (ID). Wireless communication network 100 comprises wireless user device 101, wireless access node 111, network access circuitry 112, and network authentication circuitry 113. Wireless communication network 100 delivers wireless data services to wireless user device 101 like internet-access, machine-control, data-collection, content-streaming, media-conferencing, and/or some other wireless data product. Wireless user device 101 comprises a phone, computer, sensor, controller, or some other user apparatus with processing circuitry. The processing circuitry in wireless user device 101 has a circuitry ID that might be unique to wireless user device 101. Wireless user device 101 also has a network ID, a network key, and a locked user key. The amount of wireless user devices and wireless access nodes that are shown on FIG. 1 has been restricted for clarity.

Various examples of network operation and configuration are described herein. In some examples, wireless user device 101 encrypts access data that comprises the network ID and the circuitry ID with the network key—possibly a public key for wireless communication network 100. Wireless user device 101 transfers the encrypted access data to network access circuitry 112 over wireless access node 111. Network access circuitry 112 receives and decrypts the encrypted access data with a paired network key—possibly a private key for wireless communication network 100 that is paired with the public key used by wireless user device 101. Network access circuitry 112 identifies the network ID and the circuitry ID in the decrypted access data. In response to the successful decryption using the paired network key, network access circuitry 112 establishes a secure data tunnel with wireless user device 101 over wireless access node 111. The secure data tunnel may use Transport Layer Security (TLS), Virtual Private Network (VPN), or some other data security technique.

In response to the successful decryption, network access circuitry 112 transfers an authentication request indicating the network ID and the circuitry ID for wireless user device 101 to network authentication circuitry 113. Network authentication circuitry 113 receives the authentication request and identifies the user ID based on the network ID and the circuitry ID. Network authentication circuitry 113 authenticates wireless user device 101 based on the user ID. For example, network authentication circuitry 113 and wireless user device could use Protected Extensible Authentication Protocol (PEAP) over the secure tunnel to authenticate the user ID. In another example, network authentication circuitry 113 could use the user ID to identify an Application Server (AS) and interact with the AS to authenticate the wireless user device. In yet another example, network authentication circuitry 113 could use the user ID to identify a wireless User Equipment (UE) and interact with the UE operator to authenticate the wireless user device.

In response to the successful decryption, network authentication circuitry 113 generates a new network key pair. In response to the successful decryption, network authentication circuitry 113 transfers an authentication notice for wireless user device 101 to network access circuitry 112 that indicates the new network key pair and a user key grant. Network access circuitry 112 receives the authentication notice and transfers one of the new network keys and the user key grant to wireless user device 101 over the secure data tunnel that traverses wireless access node 111.

Wireless user device 101 uses the user key grant to unlock its user key (K). Wireless user device 101 uses the user key (K) to securely communicate with network access circuitry 113. For example, wireless user device 101 may derive additional keys from the user key (K) and use the derived keys for cryptography, integrity protection, and additional authentication.

Wireless user device 101 uses the new network key—which might be a new public key for wireless communication network 100—to encrypt and transfer the network ID and circuitry ID to network access circuitry 112 for the next authentication. Network access circuitry 112 uses the new paired network key to decrypt the network ID and circuitry ID for the next authentication.

In some examples, the access data further comprises a digital certificate. Network access circuitry 112 identifies the digital certificate in the decrypted access data. Network access circuitry 112 establishes the secure data tunnel and transfers the authentication request in response to validating the digital certificate along with the successful decryption of the network ID and the circuitry ID. In some examples, the access data further comprises a random number, and network access circuitry 112 identifies the random number in the decrypted access data. Network access circuitry 112 establishes the secure data tunnel and transfers the authentication request in response to identifying the random number along with the successful decryption of the network ID and the circuitry ID.

In some examples, network access circuitry 112 comprises a non-Third Generation Partnership Project Interworking Function (non-3GPP IWF) and/or a Virtual Private Network (VPN) node. In some examples, network authentication circuitry 113 comprises a Third Generation Partnership Project (3GPP) Access and Mobility Management Function (AMF), Authentication and Security Function (AUSF), Uniform Data Management (UDM), Uniform Data Repository (UDR), and Authentication Application Function (AAF). The UDR stores the user ID, the circuitry ID, the network ID, and the user key (K) in relation to one another. The circuitry ID may comprise a CPU serial number. The network ID may comprise a Public Land Mobile Network (PLMN) ID. The user ID may comprise a Subscriber Permanent Identifier (SUPI). The user key (K) may comprise the 3GPP Key (K) and its various derivations.

Advantageously, wireless user device 101 avoids expensive SIM-based authentication. Moreover, wireless communication network 100 effectively integrates other forms of authentication like passwords, certificates, and two-factor. Wireless communication network 100 efficiently couples these types of authentication with existing user systems for quality-control and billing. To improve security, wireless user device 101 and wireless communication network 100 change the network key pair at each authentication instead of occasional OTA provisioning sessions.

Wireless user device 101 and wireless access node 111 comprise radios that wirelessly communicate using wireless protocols like Fifth Generation New Radio (5GNR), Long Term Evolution (LTE), Institute of Electrical and Electronic Engineers (IEEE) 802.11 (WIFI), Low-Power Wide Area Network (LP-WAN), Near-Field Communications (NFC), Code Division Multiple Access (CDMA), Frequency Division Multiple Access (FDMA), and Time Division Multiple Access (TDMA). Wireless user device 101, wireless access node 111, network access circuitry 112, and network authentication circuitry comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication network 100 as described herein.

FIG. 2 illustrates an exemplary operation of wireless communication network 100 to authenticate wireless user device 101 that has the circuitry ID. The operation may vary in other examples. Wireless user device 101 encrypts access data that comprises the network ID and the circuitry ID with the network key (201). Wireless user device 101 transfers the encrypted access data to network access circuitry 112 over wireless access node 111 (201). Network access circuitry 112 receives and decrypts the encrypted access data with a paired network key (202). Network access circuitry 112 identifies the network ID and the circuitry ID in the decrypted access data (202). In response to the successful decryption using the paired network key, network access circuitry 112 establishes a secure data tunnel with wireless user device 101 over wireless access node 111 (203). In response to the successful decryption, network access circuitry 112 transfers an authentication request indicating the network ID and the circuitry ID for wireless user device 101 to network authentication circuitry 113 (204).

Network authentication circuitry 113 receives the authentication request and identifies the user ID based on the network ID and the circuitry ID (205). Network authentication circuitry 113 authenticates wireless user device 101 based on the user ID (205). Network authentication circuitry 113 generates a new network key and a new paired network key (205). Network authentication circuitry 113 transfers an authentication notice for wireless user device 101 to network access circuitry 112 that indicates the new network key, the new paired network key, and a user key grant (205). Network access circuitry 112 receives the authentication notice and transfers the new network key and the user key grant to wireless user device 101 over the secure data tunnel (206). Wireless user device 101 uses the user key grant to unlock the locked user key (K) (207). Wireless user device 101 uses the unlocked user key (K) to securely communicate with network access circuitry 113 for the current data session (207). Wireless user device 101 encrypts the access data (the network ID and the circuitry ID) with the new network key and transfers the encrypted access data to network access circuitry 112 for the next authentication (208). Network access circuitry 112 decrypts the encrypted access data with the new paired network key for the next authentication (209).

Figure 3:
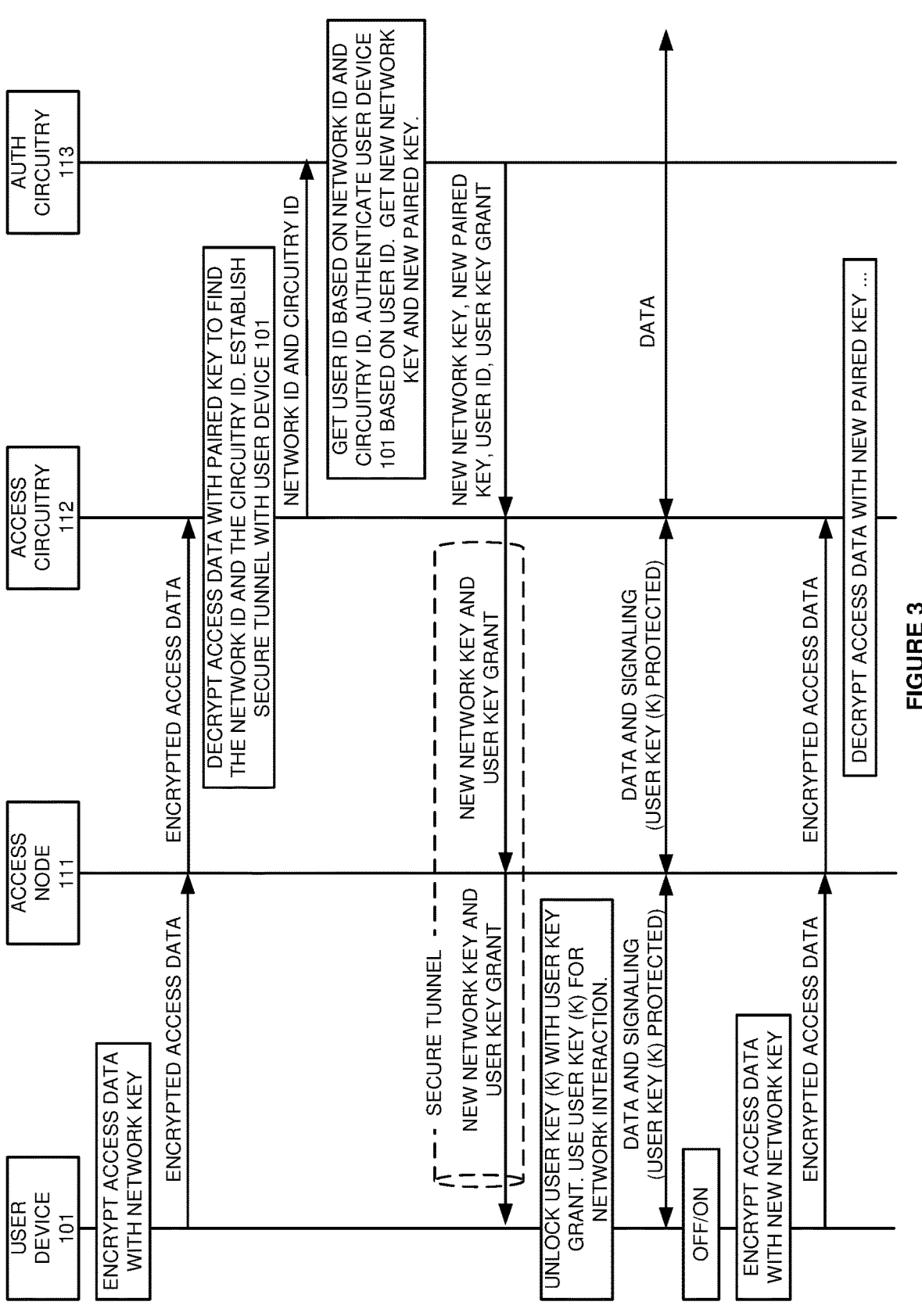
FIG. 3 illustrates an exemplary operation of the wireless communication network to authenticate the wireless user device that has the circuitry ID.

FIG. 3 illustrates an exemplary operation of wireless communication network 100 to authenticate wireless user device 101 that has the circuitry ID. The operation may vary in other examples. Wireless user device 101 encrypts access data (network ID and circuitry ID) with the network key which might be a public key for wireless communication network 100. Wireless user device 101 transfers the encrypted access data to network access circuitry 112 over wireless access node 111. Network access circuitry 112 receives and decrypts the encrypted access data with a paired network key which might be a private key that is paired with the public key for wireless communication network 100. Network access circuitry 112 finds the network ID and the circuitry ID in the decrypted access data. In response to the successful decryption using the paired network key, network access circuitry 112 establishes a secure data tunnel with wireless user device 101 over wireless access node 111. Also in response to the successful decryption, network access circuitry 112 transfers an authentication request indicating the network ID and the circuitry ID for wireless user device 101 to network authentication circuitry 113. Network authentication circuitry 113 receives the authentication request and identifies the user ID based on the network ID and the circuitry ID. Network authentication circuitry 113 authenticates wireless user device 101 based on the user ID. In some examples, network authentication circuitry 113 communicates with another data communication device that is associated with the user ID to obtain the authentication.

Network authentication circuitry 113 generates a new network key pair. Network authentication circuitry 113 transfers an authentication notice for wireless user device 101 to network access circuitry 112 that indicates the new network key pair, the user ID, and a user key grant. Network access circuitry 112 receives the authentication notice and transfers one of the new network keys and the user key grant to wireless user device 101 over the secure data tunnel. Wireless user device 101 uses the user key grant to unlock the locked user key (K). Wireless user device 101 uses the user key (K) to derive several additional user keys. Wireless user device 101 uses the derived keys to securely communicate with network access circuitry 112 using encryption and integrity protection.

Wireless user device 101 is turned off and then turned back on which relocks the user key (K) in wireless user device 101. To unlock the user key, wireless user device 101 uses the new network key to encrypt and transfer the access data to network access circuitry 112 for the next authentication. Network access circuitry 112 uses the new paired network key to decrypt this encrypted access data for the next authentication. The new network key and new paired key may be another public/private key pair for network 100. The operation repeats as described above with access circuitry 112 invoking authentication circuitry 113 to authenticate wireless user device 101 and unlock the locked user key (K).

Figure 4:
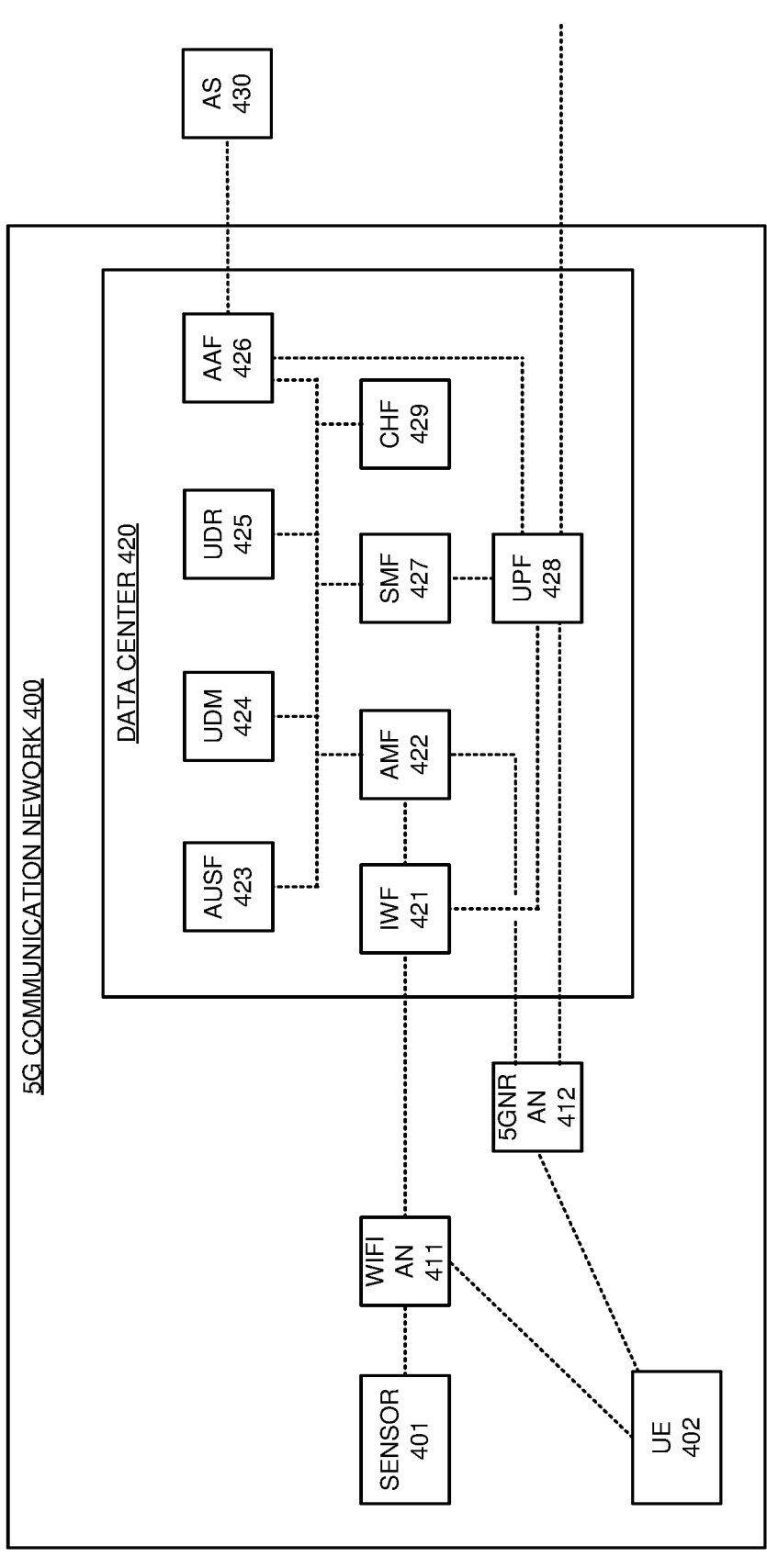
FIG. 4 illustrates an exemplary Fifth Generation (5G) wireless communication network to authenticate a sensor that has a Central Processing Unit (CPU) serial number, Public Mobile Land Network Identifier (PLMN ID), public network key, and long-term key (K).

FIG. 4 illustrates an exemplary Fifth Generation (5G) wireless communication network 400 to authenticate sensor 401 that has a Central Processing Unit (CPU) serial number, a Public Mobile Land Network (PLMN) ID, a public network key, and a long-term key (K). 5G communication network 400 comprises an example of wireless communication network 100, although network 100 may differ. 5G communication system 400 comprises: sensor 401, User Equipment (UE) 402, WIFI Access Node (AN) 411, 5GNR AN 412, network data center 420, and Application Server (AS) 430. Network data center 420 comprises non-3GPP Interworking Function (IWF) 421, Access and Mobility Management Function (AMF) 422, Authentication and Security Function (AUSF) 423, Unified Data Management (UDM) 424, Unified Data Repository (UDR) 425, Authentication Application Function (AAF) 426, Session Management Function (SMF) 427, User Plane Function (UPF) 428, and Charging Function (CHF) 429. Network data center 420 typically includes additional network functions like Network Repository Function (NRF) that are omitted for clarity. The number of sensors, UEs, ANs, AS, and data centers that are shown on FIG. 4 has been restricted for clarity.

In some examples, AS 430 authenticates sensor 401. In other examples, UE 402 authenticates sensor 401. Before sensor 401 is authenticated by UE 402, UE 402 performs a standard 3GPP authentication over 5GNR AN 412 as follows. Alternatively, UE 402 could perform standard 3GPP authentication over WIFI AN 411 and IWF 421.

In UE 402, a Subscriber Identity Module (SIM) encodes a Subscriber Permanent Identifier (SUPI) for UE 401 with a public key for 5G communication network 100 to generate a Subscriber Concealed Identifier (SUCI) for UE 402. UE 402 transfers its SUCI to AMF 422 over 5GNR AN 412 or WIFI AN and IWF 421. AMF 422 transfers the SUCI for UE 402 to AUSF 423, and AUSF 423 transfers the SUCI for UE 402 to UDM 424. UDM 424 has a private key for 5G communication network 400 that is paired with the public network key used by UE 402. UDM 424 decodes the SUCI into the SUPI for UE 402 with this private network key. UDM 424 enters UDR 425 with the SUPI to yield the long-term key (K) and other information for UE 402.

For SIM-based authentication, UE 402 and UDR 425 store the long-term key (K) and the SUPI for UE 402. In data center 420, the long-term key (K) for UE 402 is used to derive various other keys for UE 402 as follows: Ck and Ik in UDM 424; Ck', Ik', $K_{AUSF}$, and $K_{SEAF}$ in AUSF 423; $K_{AMF}$, $K_{N31WF}$, $K_{gNB}$, and $K_{NAS}$ in AMF 421; and $K_{RRC}$ and $K_{UP}$ in 5GNR AN 412. In UE 402, the SIM derives Ck and Ik from the long-term key (K), and UE circuitry derives the remaining keys from Ck and Ik (Ck', Ik', $K_{AUSF}$, $K_{SEAF}$, $K_{AMF}$, $K_{N31WF}$, $K_{gNB}$, $K_{NAS}$, $K_{RRC}$, and $K_{UP}$). For clarity, all of these derived keys are generally referred to as K in the following discussion.

UDM 424 hashes K and a random number (RAND) to generate an Expected Result (XRES). UDM 424 transfers K, RAND, XRES, and other data to AUSF 423. AUSF 423 transfers K and RAND to AMF 422. AMF 423 transfers RAND to UE 402 over 5GNR AN 412 or IWF 421 and WIFI AN 411. UE 402 hashes the RAND to generate a hash result. UE 402 transfers the hash result to AMF 422 over 5GNR AN 412 or WIFI AN 411 and IWF 421. AMF 422 transfers the hash result to AUSF 423. AUSF 423 matches the hash result from UE 402 with the XRES to authenticate UE 402. AUSF 423 notifies UDM 424 of the authentication, and UDM 424 writes the new UE 402 authentication status to UDR 425. AUSF 423 notifies AMF 422 of the authentication, and AMF 422 notifies UE 402 of the authentication. AMF 422 transfers UE context for the data session to UE 402, SMF 427, and 5GNR AN 412 or IWF 421. SMF 427 transfers UE context for the data session to UPF 428. AAF 426 now has a data path to UE 402 for sensor authentication over WIFI AN 411-IWF 421-UPF 428 and/or 5GNR AN 412-UPF 428.

When sensor 401 needs data communications, sensor 401 encrypts its PLMN ID, CPU serial number, a random number, and an X.509 certificate with a public key for 5G communication network 400. Sensor 401 transfers this encrypted access information to IWF 421 over WIFI AN 411. IWF 421 decrypts the encrypted access information with a private key for 5G communication network 400 that is paired with the public key used by sensor 401. IWF 421 also verifies the random number and the X.509 certificate. In response to this successful decryption of the encrypted access information with the private key for network 400, IWF 421 transfers the PLMN ID and CPU serial number for sensor 401 to AMF 422 which transfers the PLMN ID and CPU serial number for sensor 401 to AUSF 423. AUSF 423 transfers the PLMN ID and CPU serial number for sensor 401 to UDM 424 which transfers the PLMN ID and CPU serial number for sensor 401 to UDR 425. UDR 425 yields the long-term key (K) and SUPI for sensor 401 to UDM 424 based on the PLMN ID and CPU serial number. For example, UDR 425 may host a data structure that associates the PLMN ID and CPU serial number for sensor 401 with the long-term key (K) and SUPI for sensor 401. In those examples, the SUPI for sensor 401 is the same as the SUPI for UE 402—although the long-term key (K) for sensor 401 is different from the long-term key (K) for UE 402. UDM 424 transfers the long-term key (K) and SUPI for sensor 401 to AUSF 423. AUSF 423 receives the long-term key (K) and SUPI for sensor 401.

To perform authentication, AUSF 423 transfers the SUPI, PLMN ID, and CPU serial number for sensor 401 to AAF 426. AAF 426 matches the SUPI for sensor 401 with the SUPI for UE 402. AAF 426 transfers the PLMN ID and CPU serial number for sensor 401 to UE 402 for authentication over UPF 428 and 5GNR AN 412 or IWF 421 and WIFI AN 411. In some examples, UE 402 hosts a list of authentic CPU serial number and PLMN ID combinations. UE 402 matches the PLMN ID and CPU serial number for sensor 401 with an authentic CPU serial number and PLMN ID combination to authenticate. In other examples, UE 402 displays a user prompt that indicates the CPU serial number and PLMN ID, and in response, receives a user response to authenticate sensor 401. In response to the match or user response, UE 402 transfers a positive authentication response for sensor 401 to AAF 426 over WIFI AN 411-IWF 411-UPF 428 or 5GNR AN 412-UPF 428. AAF 426 transfers the positive authentication response to AUSF 423. AUSF 423 indicates the authentication of sensor 401 to UDM 424 which writes the authentication status for sensor 401 to UDR 425.

In response to the authentication of sensor 401 by UE 402, UDM 424 generates a new public/private key pair for sensor 401 and transfers the new public/private key pair for sensor 401 to AUSF 423. In response to the authentication of sensor 401, AUSF 423 transfers the SUPI, K, new public/private key pair, and a token for sensor 401 to AMF 422. AMF 422 transfers the K ($K_{IWF}$) and the new public/private key pair, and token for sensor 401 to IWF 421. IWF 421 transfers the new public key and the token to sensor 401 over WIFI AN 411.

Sensor 401 receives the new public key and token from IWF 421. Sensor 401 unlocks its own long-term key (K) using the token and derives some of the additional keys. AMF 422 transfers context for sensor 401 to IWF 421 and SMF 427. SMF 427 transfers context for sensor 401 to UPF 428. IWF 421 transfers the context to sensor 401 over WIFI AN 411. Sensor 401 uses cryptography and integrity protection based on the derived keys to exchange sensor data with IWF 422 over WIFI AN 411 based on the context for sensor 401. IWF 421 and UPF 428 exchange the sensor data based on the context for sensor 401. UPF 428 exchanges the sensor data with external systems based on the context for sensor 401.

UPF 428 transfers usage data for sensor 401 to SMF 427. SMF 427 transfers the usage data and SUPI for sensor 401 to CHF 429. CHF 429 generates user charges for the usage by sensor 401. In this example, CHF 429 allocates the charges to the SUPI for UE 402 that is shared with sensor 401.

Sensor 401 powers down and subsequently powers back up which relocks the long-term key (K). Sensor 401 encrypts its PLMN ID, CPU serial number, random number, and X.509 certificate with the new public key for 5G communication network 400. Sensor 401 transfers this encrypted access information to IWF 421 over WIFI AN 411. IWF 421 decrypts the encrypted access information with the new private key for 5G communication network 400 that is paired with the new public key that was used by sensor 401. IWF 421 also verifies the random number and the X.509 certificate. In response to the successful decryption of the encrypted access information with the new private key, IWF 421 transfers the PLMN ID and CPU serial number for sensor 401 to AMF 422 which transfers the PLMN ID and CPU serial number for sensor 401 to AUSF 423. The operation now repeats the above-described operation to authenticate sensor 401 and unlock its long-term key (K).

When AS 430 is used for authentication instead of UE 402, AS 430 registers with AAF 426 over the internet and establishes a secure tunnel. AS 430 subscribes to a sensor authentication service from AAF 426 that includes sensor 401. AAF 426 matches the SUPI for sensor 401 with the subscription from AS 430. AAF 426 transfers the PLMN ID and CPU serial number for sensor 401 to AS 430. AS 430 hosts a list of authentic CPU serial number and PLMN ID combinations. In some examples, AS 430 matches the PLMN ID and CPU serial number for sensor 401 with an authentic CPU serial number and PLMN ID combination on the list. In other examples, AS 430 displays a user prompt that indicates the CPU serial number and PLMN ID, and in response, receives a user response to authenticate sensor 401. In response to the match or user response, AS 430 transfers a positive authentication response for sensor 401 to AAF 426. AAF 426 transfers the positive authentication response to AUSF 423. The operation then continues as described above to complete the authentication of sensor 401.

Figure 5:
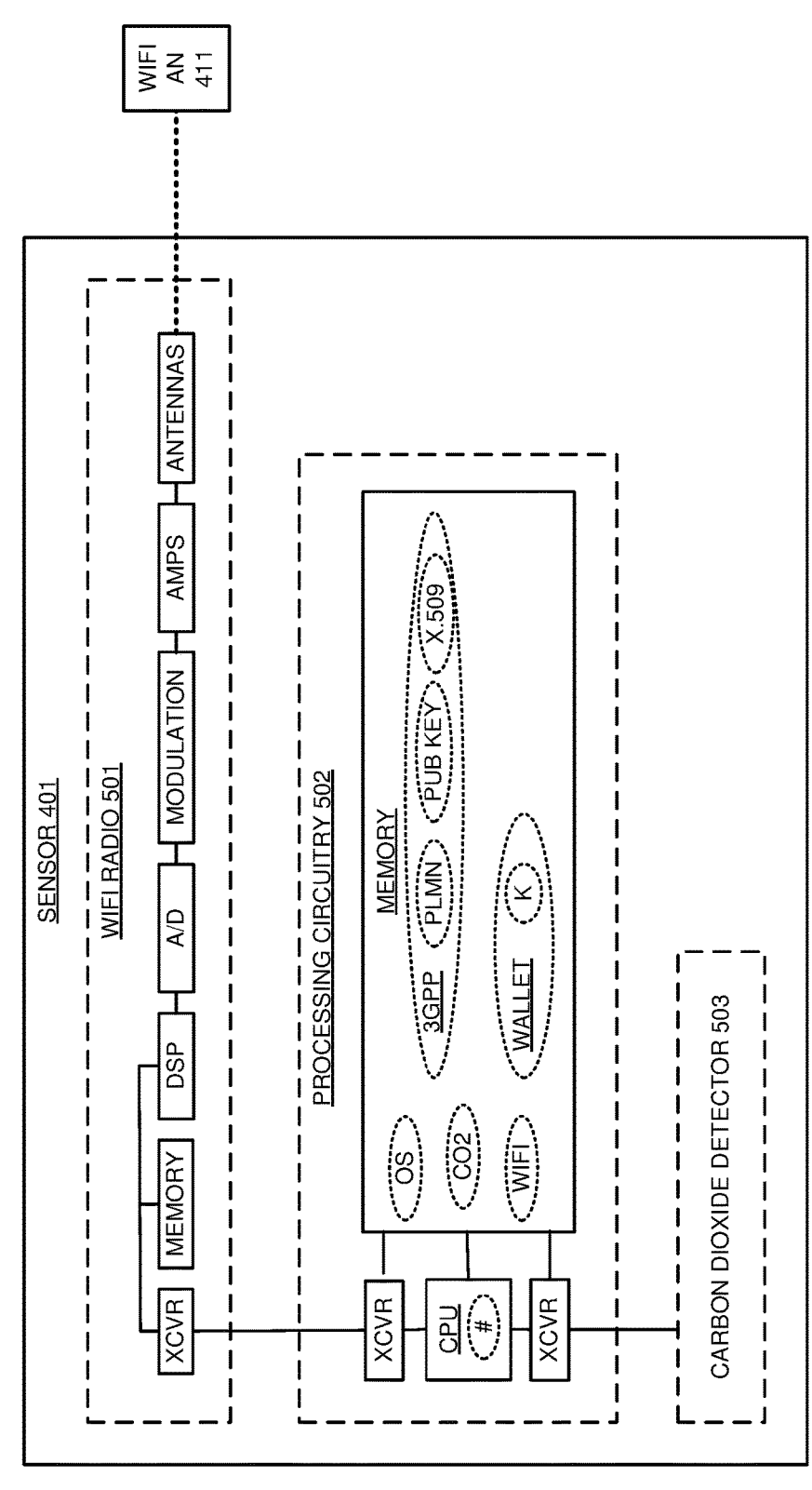
FIG. 5 illustrates an exemplary sensor in the 5G communication network.

FIG. 5 illustrates exemplary sensor 401 in 5G communication network 400. Sensor 401 comprises an example of wireless user device 101, although device 101 may differ. Sensor 401 comprises WIFI radio 501, processing circuitry 502, and carbon dioxide detector 503. WIFI radios 501 comprises antennas, amplifiers, filters, modulation, analog-to-digital interfaces, DSP, memory, and transceivers that are coupled over bus circuitry. Processing circuitry 502 comprises CPU, memory, and transceivers (XCVRs) that are coupled over bus circuitry. The CPU has a serial number (#). The memory in processing circuitry 502 stores software for Operating System (OS), carbon dioxide reporting (CO2), WIFI, 3GPP, and wallet. The 3GPP software has a public key, PLMN list (PLMN), and an X.509 certificate for 5G communication network 400. The wallet software has a long-term key (K) for sensor 401 and 5G communication network 400. The wallet software requires a token before unlocking the long-term key (K) and locks the long-term key (K) at power-up. The antennas in WIFI radio 501 exchange WIFI signals with WIFI AN 411. The transceiver in WIFI radio 501 is coupled to a transceiver in processing circuitry 502. In processing circuitry 502, the CPU retrieves the software from the memory and executes the software to direct the operation of sensor 401 as described herein.

Figure 6:
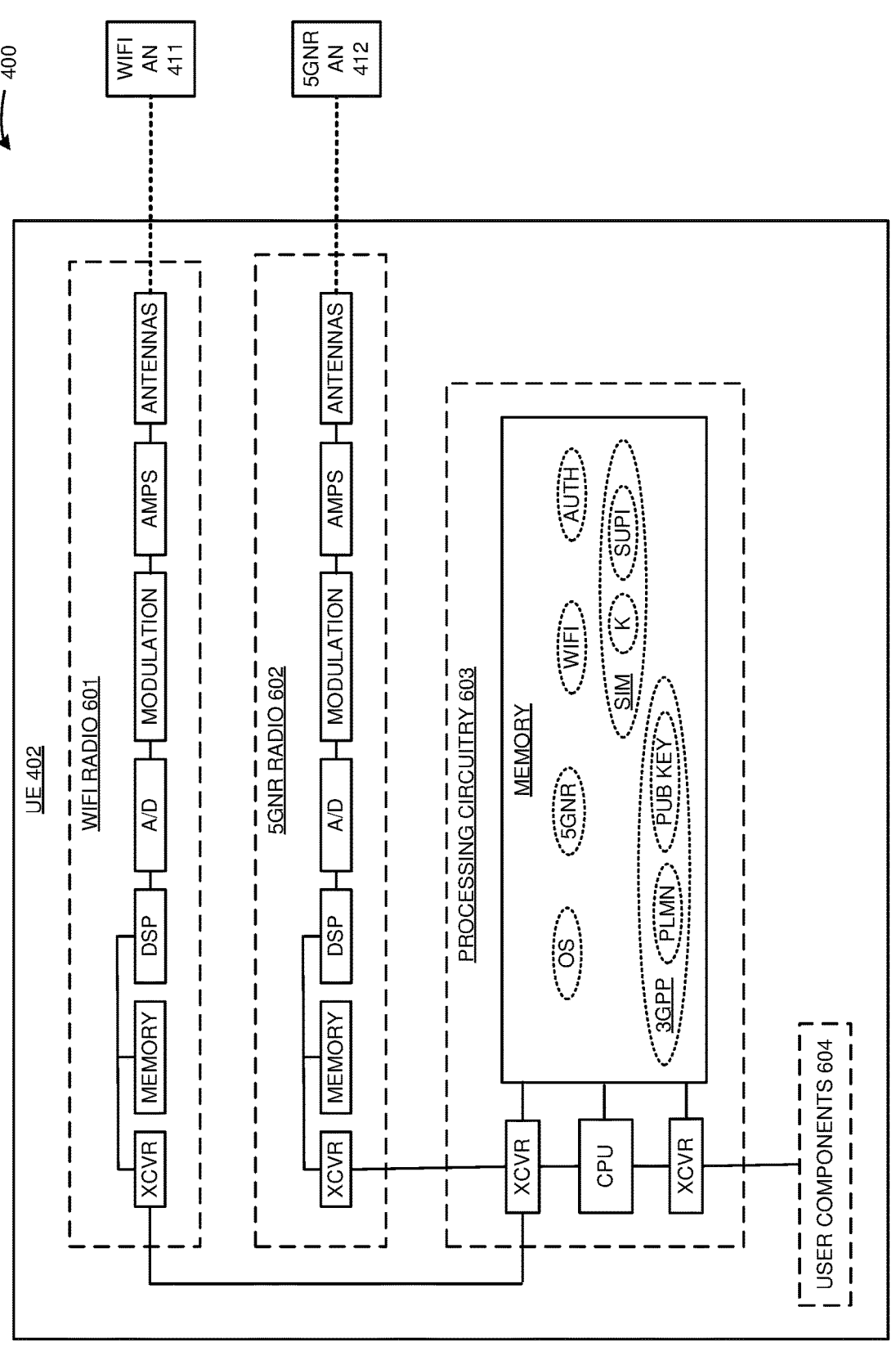
FIG. 6 illustrates an exemplary User Equipment (UE) in the 5G communication network.

FIG. 6 illustrates exemplary User Equipment (UE) 402 in 5G communication network. UE 402 comprises WIFI radio 601, 5GNR radio 602, processing circuitry 603, and carbon dioxide detector 604. Radios 601-602 comprise antennas, amplifiers, filters, modulation, analog-to-digital interfaces, DSP, memory, and transceivers that are coupled over bus circuitry. Processing circuitry 603 comprises CPU, memory, and transceivers that are coupled over bus circuitry. The memory in processing circuitry 603 stores software for OS, 3GPP, 5GNR, WIFI SIM, and sensor authentication (AUTH). The 3GPP software has a public key for 5G communication network 400. The SIM software a long-term key (K) for 5G communication network 400 and a Subscriber Permanent Identifier (SUPI) for UE 402 and 5G communication network 400. User components 604 comprise displays, microphones, and the like. The antennas in WIFI radio 601 exchange WIFI signals with WIFI AN 411. The antennas in 5GNR radio 602 exchange 5GNR signals with 5GNR AN 412. The transceivers in radios 601-602 are coupled to transceivers in processing circuitry 603. In processing circuitry 603, the CPU retrieves the software from the memory and executes the software to direct the operation of UE 402 as described herein.

Figure 7:
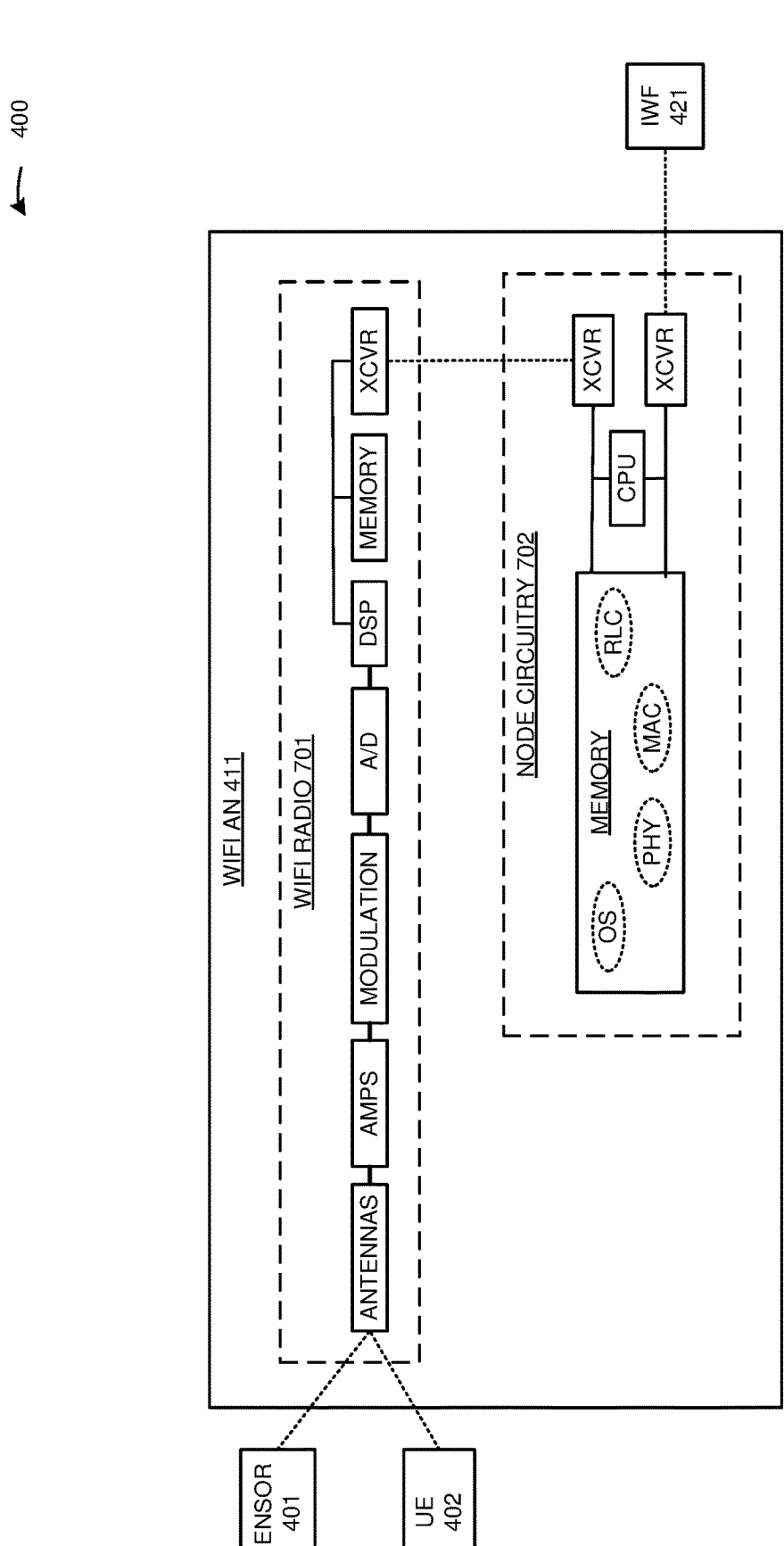
FIG. 7 illustrates an exemplary WIFI Access Node (AN) in the 5G communication network.

FIG. 7 illustrates exemplary WIFI Access Node (AN) 411 in 5G communication network 400. WIFI AN 411 comprises and example of wireless access node 111, although access node 111 may differ. WIFI AN 411 comprises WIFI radio 701 and node circuitry 702. WIFI radio 701 comprises antennas, amplifiers, filters, modulation, analog-to-digital interfaces, DSP, memory, radio applications, and transceivers that are coupled over bus circuitry. Node circuitry 702 comprises memory, CPU, and transceivers that are coupled over bus circuitry. The memory in node circuitry 702 stores an operating system and WIFI network applications for Physical Layer, PHY, Media Access Control (MAC), and Radio Link Control (RLC). The antennas in WIFI radio 701 are wirelessly coupled to sensor 401 and UE 402 over WIFI links. Transceivers in WIFI radio 701 are coupled to transceivers in node circuitry 702. Transceivers in node circuitry 702 are coupled to IWF 421. The CPU in node circuitry 702 executes the radio applications, operating systems, and network applications to exchange data and signaling with sensor 401, UE 402, and IWF 421 as described herein.

Figure 8:
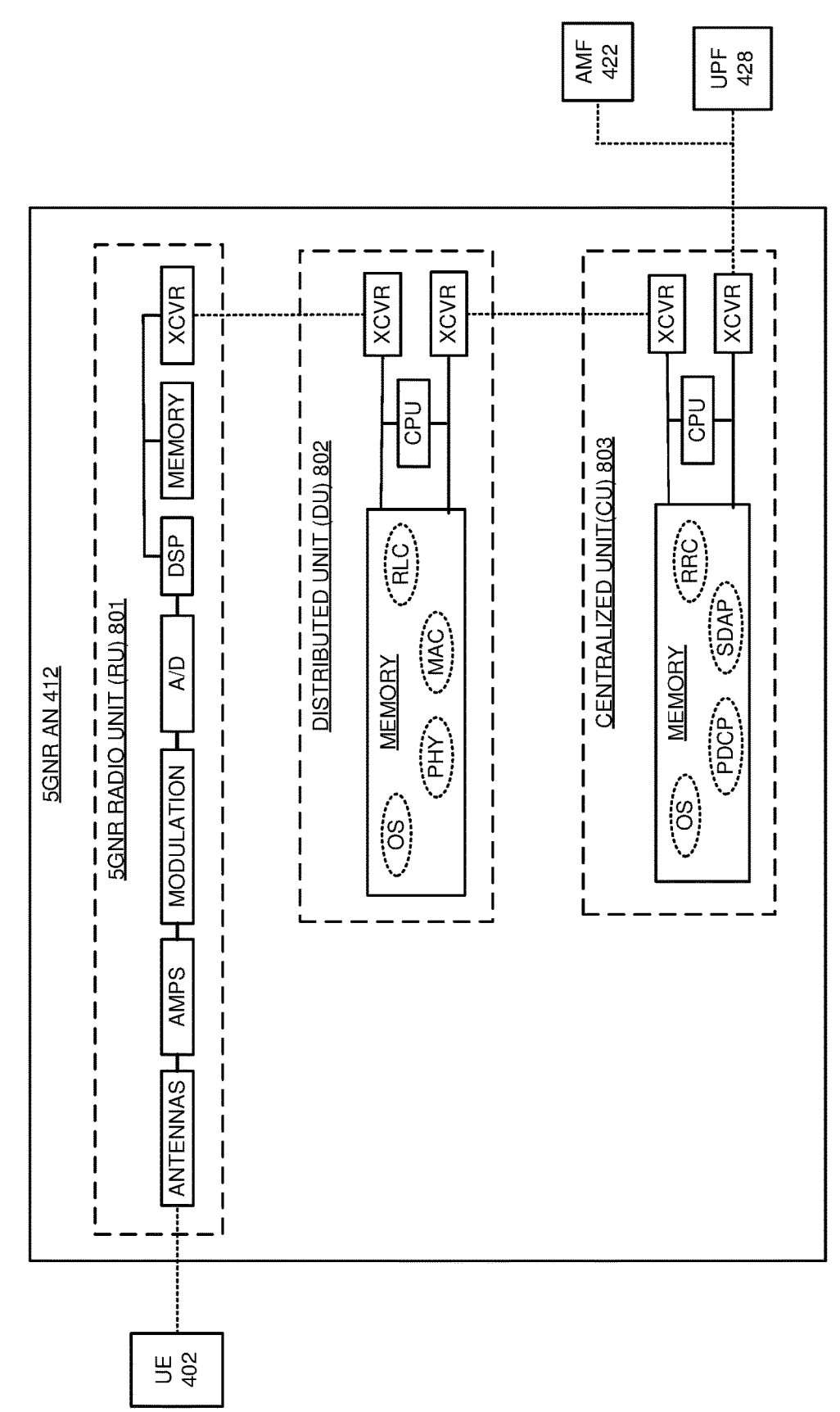
FIG. 8 illustrates an exemplary 5G New Radio (5GNR) AN in the 5G communication network.

FIG. 8 illustrates exemplary 5G New Radio (5GNR) AN 412 in 5G communication network 400. 5GNR AN 412 comprises and example of wireless access node 111, although access node 111 may differ. 5GNR AN 412 comprises 5GNR Radio Unit (RU) 801, Distributed Unit (DU) 802, and Centralized Unit (CU) 803. 5GNR RU 801 comprises antennas, amplifiers, filters, modulation, analog-to-digital interfaces, DSP, memory, radio applications, and transceivers that are coupled over bus circuitry. DU 802 comprises memory, CPU, user interfaces and components, and transceivers that are coupled over bus circuitry. The memory in DU 802 stores operating system and 5GNR network applications for PHY, MAC, and RLC. CU 803 comprises memory, CPU, and transceivers that are coupled over bus circuitry. The memory in CU 803 stores an operating system and 5GNR network applications for Packet Data Convergence Protocol (PDCP), Service Data Adaption Protocol (SDAP), and Radio Resource Control (RRC). The antennas in 5GNR RU 801 are wirelessly coupled to wireless UE 402 over a 5GNR link. Transceivers in 5GNR RU 801 are coupled to transceivers in DU 802. Transceivers in DU 802 are coupled to transceivers in CU 803. Transceivers in CU 803 are coupled AMF 422 and UPF 428. The DSP and CPU in RU 601, DU 602, and CU 603 execute the radio applications, operating systems, and network applications to exchange data and signaling with UE 402, AMF 422, and UPF 428 as described herein.

Figure 9:
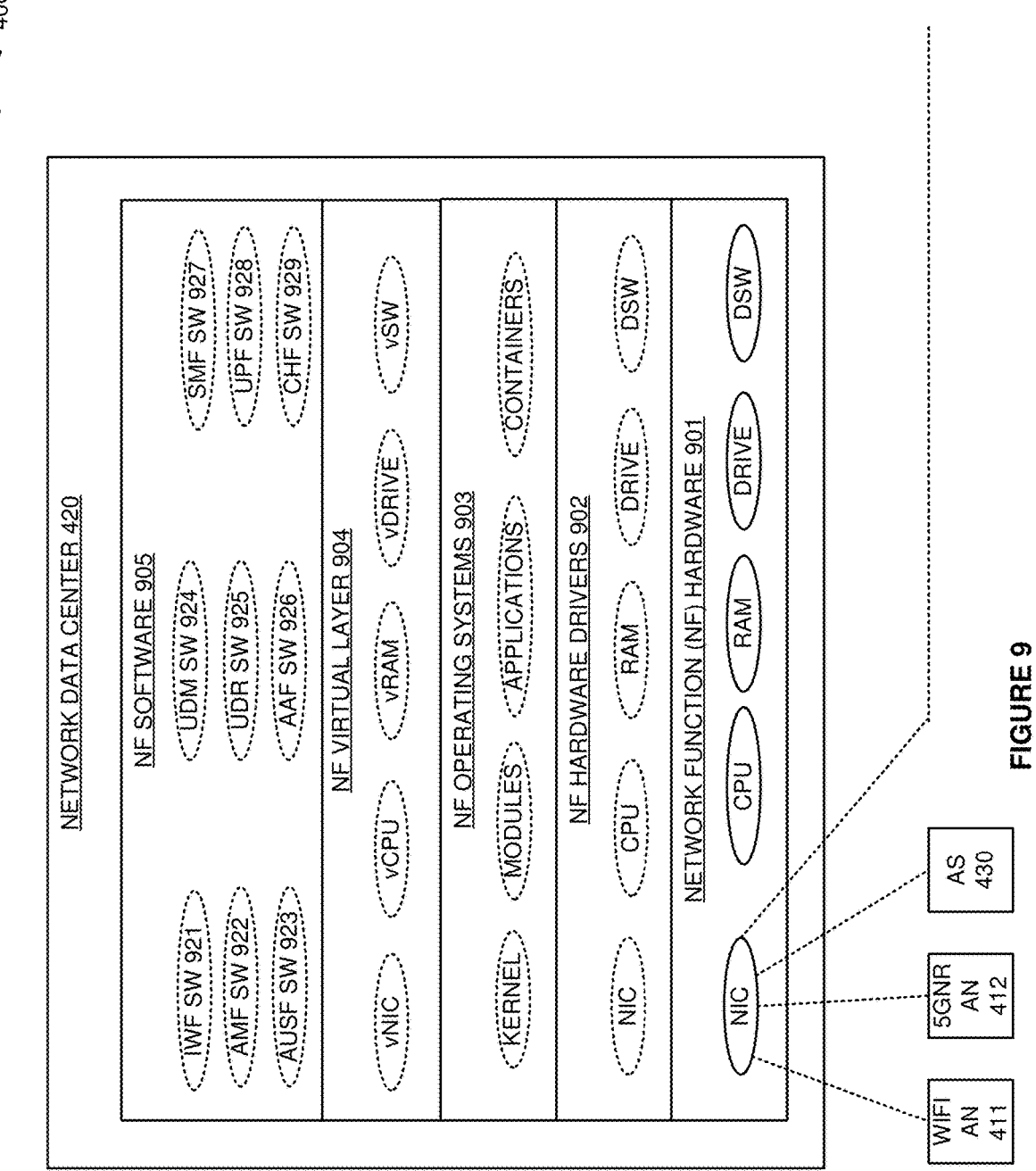
FIG. 9 illustrates an exemplary data center in the 5G communication network.

FIG. 9 illustrates exemplary data center 420 in 5G communication network 400. Network data center 420 comprises an example of network access circuitry 112 and network authentication circuitry 113, although circuitry 112-113 may differ. Network data center 420 comprises Network Function (NF) hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, and applications that form containers for virtual layer and NF software execution. NF virtual layer 904 comprises vNIC, vCPU, vRAM, vDRIVE, and vSW. NF SW 905 comprises IWF SW 921, AMF SW 922, AUSF SW 923, UDM SW 924, UDR SW 925, AAF SW 926, SMF SW 927, UPF SW 928, and CHF SW 929. Other NF SW like Network Repository Function (NRF) SW is typically present but is omitted for clarity. Network data center 420 may be located at a single site or be distributed across multiple geographic locations. The NIC in NF hardware 901 are coupled to WIFI AN 411, 5GNR AN 412, AS 430, and external systems. NF hardware 901 executes NF hardware drivers 902, NF operating systems 903, NF virtual layer 904, and NF SW 905 to form and operate IWF 421, AMF 422, AUSF 423, UDM 424, UDR 425, AAF 426, SMF 427, UPF 428, and CHF 429 as described herein.

Figure 10:
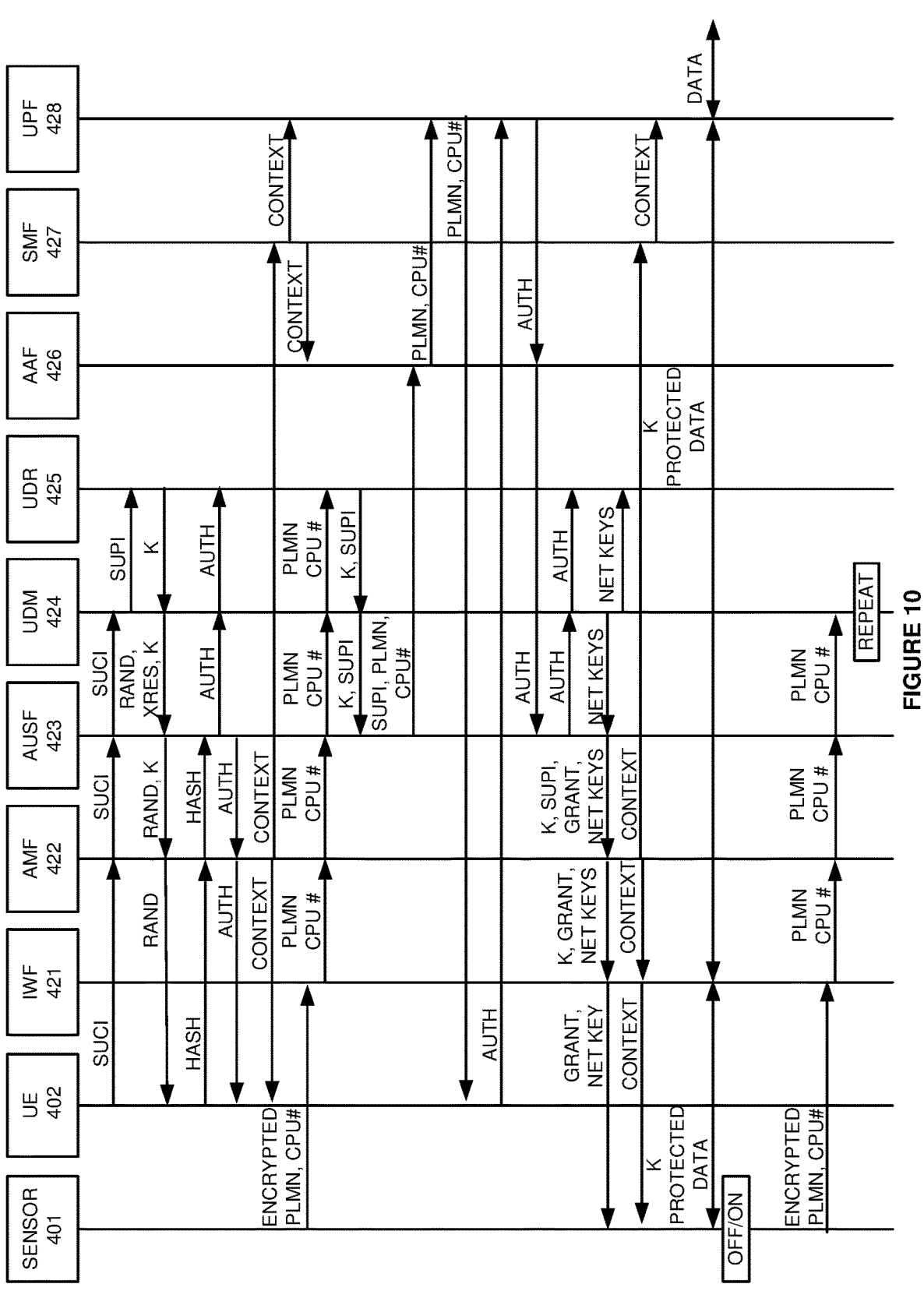
FIG. 10 illustrates an exemplary operation of the 5G communication network to authenticate the sensor that has the CPU serial number, PLMN ID, public network key, and long-term key (K).

FIG. 10 illustrates an exemplary operation of 5G communication network 400 to authenticate sensor 401 that has the CPU serial number, PLMN ID, public network key, and long-term key (K). The operation may vary in other examples. UE 402 encodes its SUPI into a SUCI and transfers the SUCI to AMF 422 over 5GNR AN 412 (5GNR AN 412 is not shown for clarity). AMF 422 transfers the SUCI for UE 402 to AUSF 423, and AUSF 423 transfers the SUCI for UE 402 to UDM 424. UDM 424 has a private key for 5G communication network 400 that is paired with the public key used by UE 402. UDM 424 decodes the SUCI into the SUPI for UE 402 with this private key. UDM 424 enters UDR 425 with the SUPI to yield the long-term key (K) and other information for UE 402.

UDM 424 hashes derivatives of the long-term key (K) and a random number (RAND) to generate an Expected Result (XRES). UDM 424 transfers K, RAND, XRES, and other data to AUSF 423. AUSF 423 transfers K, RAND, and other data to AMF 422. AMF 423 transfers the RAND and other data to UE 402 over 5GNR AN 412. UE 402 hashes the RAND to generate a hash result. UE 402 transfers the hash result to AMF 422 over 5GNR 412. AMF 422 transfers the hash result to AUSF 423. AUSF 423 matches the hash result from UE 402 with XRES to authenticate UE 402. AUSF 423 notifies UDM 424 of the authentication, and UDM 424 writes the new UE 402 status to UDR 425. AUSF 423 notifies AMF 422 of the authentication, and AMF 422 notifies UE 402 of the authentication. AMF 422 transfers UE context for the data session to UE 402, SMF 427, and 5GNR AN 412. SMF 427 transfers UE context for the data session to UPF 428. UE 402 now has a data path through 5GNR AN 412 and UPF 428 to AAF 426 for sensor authentication.

When data communications are needed, sensor 401 encrypts its PLMN ID, CPU serial number, random number, and a X.509 certificate with the current public key for 5G communication network 400. Sensor 401 transfers this encrypted access information to IWF 421 over WIFI AN 411. IWF 421 decrypts the encrypted access information with the current private key for 5G communication network 400 that is paired with the public key used by sensor 401. IWF 421 also verifies the random number and the X.509 certificate. In response to the successful decryption of the encrypted access information with the private key, IWF 421 transfers the PLMN ID and CPU serial number for sensor 401 to AMF 422 which transfers the PLMN ID and CPU serial number for sensor 401 to AUSF 423. AUSF 423 transfers the PLMN ID and CPU serial number for sensor

401 to UDM 424 which transfers the PLMN ID and CPU serial number for sensor 401 to UDR 425. UDR 425 yields the long-term key (K) and SUPI for sensor 401 to UDM 424. The SUPI for sensor 401 is the same as the SUPI for UE 402, but the K for sensor 401 is different from the K for UE 402. UDM 424 transfers the K and SUPI for sensor 401 to AUSF 423. AUSF 423 receives the K and SUPI for sensor 401. To perform authentication, AUSF 423 transfers the SUPI, PLMN ID, and CPU serial number for sensor 401 to AAF 426.

AAF 426 matches the SUPI for sensor 401 with the SUPI for UE 402. AAF 426 transfers the PLMN ID and CPU serial number for sensor 401 to UE 402 over UPF 428 and 5GNR AN 412. In response to the match, UE 402 transfers a positive authentication response for sensor 401 to AAF 426 over 5GNR AN 412 and UPF 428. AAF 426 transfers the positive authentication response to AUSF 423. AUSF 423 indicates the authentication of sensor 401 to UDM 424 which writes the status for sensor 401 to UDR 425.

In response to the authentication of sensor 401, UDM 424 generates a new public/private key pair for 5G communication network 400 and transfers the new public/private keys for network 400 to AUSF 423. In response to the authentication of sensor 401, AUSF 423 transfers the SUPI, K, new public/private keys, and a token for sensor 401 to AMF 422. AMF 422 transfers the K, new public/private keys, and token for sensor 401 to IWF 421. IWF 421 transfers the new public key and the token to sensor 401 over WIFI AN 411.

Sensor 401 receives the new public key and token from IWF 421. Sensor 401 unlocks its own long term key (K) using the token and derives additional keys. AMF 422 transfers context for sensor 401 to IWF 421 and SMF 427. SMF 427 transfers context for sensor 401 to UPF 428. IWF 421 transfers context to sensor 401 over WIFI AN 411. Sensor 401 uses data encryption and integrity based on the derived keys to securely exchange sensor data with IWF 421 over WIFI AN 411 based on the context for sensor 401. IWF 421 and UPF 428 exchange the sensor data based on the context for sensor 401. UPF 428 exchanges the sensor data with external systems based on the context for sensor 401.

UPF 428 transfers usage data for sensor 401 to SMF 427. SMF 427 transfer the usage data and SUPI for sensor 401 to CHF 429. CHF 429 generates user charges for sensor 401 based on the usage data. CHF 429 allocates the charges for sensor 401 to the SUPI for UE 402.

Sensor 401 powers down and subsequently powers back up. Sensor 401 again encrypts PLMN ID, CPU serial number, random number, and X.509 certificate with the new public key for 5G communication network 400. Sensor 401 transfers this encrypted access information to IWF 421 over WIFI AN 411. IWF 421 decrypts the encrypted access information with the new private key for 5G communication network 400 that is paired with the new public key used by sensor 401. IWF 421 also verifies the random number and the X.509 certificate. In response to the successful decryption of the encrypted access information with the new private key, IWF 421 transfers the PLMN ID and CPU serial number for sensor 401 to AMF 422 which transfers the PLMN ID and CPU serial number for sensor 401 to AUSF 423. The operation repeat as above to authenticate sensor 401 and unlock its long-term key (K).

The wireless data network circuitry described above comprises computer hardware and software that form special-purpose wireless network circuitry to authenticate wireless user devices that have circuitry IDs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to authenticate wireless user devices that have circuitry IDs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to authenticate a wireless user device that has a circuitry Identifier (ID), the method comprising:

network access circuitry receiving encrypted access data that was encrypted by the wireless user device with an initial network key, decrypting the encrypted access data with an initial paired key, and identifying a network ID and the circuitry ID in the decrypted access data, and in response to decrypting the encrypted access data, establishing a secure data tunnel with the wireless user device and transferring an authentication request indicating the circuitry ID for the wireless user device to network authentication circuitry;

the network authentication circuitry receiving the authentication request, identifying a user ID based on the circuitry ID, and authenticating the wireless user device based on the user ID, and in response to authentication of the wireless user device, generating a new network key and a new paired key for the wireless user device to replace the initial network key and initial paired key and transferring an authentication notice for the wireless user device to the network access circuitry that indicates the new network key, the new paired key, and a user key grant; and the access circuitry receiving the authentication notice and transferring the new network key and the user key grant to the wireless user device over the secure data tunnel, wherein the wireless user device uses the user key grant to unlock a user key, uses the user key to securely communicate with the wireless communication network for a current data session, and after termination of the current data session, uses the new network key to subsequently encrypt and transfer the access data to the network access circuitry for a subsequent data session.

2. The method of claim 1 wherein the network authentication circuitry authenticating the wireless user device based on the user ID comprises transferring a challenge to another data communication device associated with the user ID, receiving an answer from the other data communication device in response to the challenge, and validating the answer.

3. The method of claim 1 wherein the network authentication circuitry authenticating the wireless user device based on the user ID comprises transferring the circuitry ID to another data communication device associated with the user ID and receiving an authentication instruction from the other data communication device, wherein the other data communication device authenticates the wireless user device based on the circuitry ID to transfer the authentication instruction.

4. The method of claim 1 further comprising:

the network access circuitry identifying a digital certificate in the decrypted access data; and wherein:

the network access circuitry establishing the secure data tunnel and transferring the authentication request comprises establishing the secure data tunnel and transferring the authentication request in response to validating the digital certificate in the decrypted access data.

5. The method of claim 1 further comprising:

the network access circuitry identifying a random number in the decrypted access data; and wherein:

the network access circuitry establishing the secure data tunnel and transferring the authentication request comprises establishing the secure data tunnel and transferring the authentication request in response to identifying the random number in the decrypted access data.

6. The method of claim 1 wherein the network authentication circuitry further comprises at least one of a Uniform Data Management (UDM) and a Uniform Data Repository (UDR) storing the user ID, the circuitry ID, the network ID, and the user key in association with one another.

7. The method of claim 1 wherein the network access circuitry comprises a non-Third Generation Partnership Project Interworking Function (non-3GPP IWF).

8. The method of claim 1 wherein the network authentication circuitry comprises a Third Generation Partnership Project Access and Mobility Management Function (3GPP AMF) and a Third Generation Partnership Project Authentication and Security Function (3GPP AUSF).

9. The method of claim 1 wherein:

the user ID comprises a Subscriber Permanent Identifier (SUPI); and the user key comprises a Third Generation Partnership Project (3GPP) Key (K).

10. The method of claim 1 wherein the circuitry ID comprises a Central Processing Unit (CPU) serial number.

11. A wireless communication network to authenticate a wireless user device that has a circuitry Identifier (ID), the wireless communication network comprising:

network access circuitry configured to receive encrypted access data that was encrypted by the wireless user device with an initial network key, decrypt the encrypted access data with an initial paired key, and identify a network ID and the circuitry ID in the decrypted access data, and in response to decrypting the encrypted access data, establish a secure data tunnel with the wireless user device and transfer an authentication request indicating the circuitry ID for the wireless user device to network authentication circuitry;

the network authentication circuitry configured to receive the authentication request, identify a user ID based on the circuitry ID, and authenticate the wireless user device based on the user ID, and in response to authentication of the wireless user device, generate a new network key and a new paired key for the wireless user device to replace the initial network key and initial paired key and transfer an authentication notice for the wireless user device to the network access circuitry that indicates the new network key, the new paired key, and a user key grant; and the network access circuitry further configured to receive the authentication notice and transfer the new network key and the user key grant to the wireless user device over the secure data tunnel, wherein the wireless user device is configured to use the user key grant to unlock a user key, use the user key to securely communicate with the wireless communication network for a current data session, and after termination of the current data session, use the new network key to subsequently encrypt and transfer the access data to the network access circuitry for a subsequent data session.

12. The wireless communication network of claim 11 wherein the network authentication circuitry is configured to transfer a challenge to another data communication device associated with the user ID, receive an answer from the other data communication device in response to the challenge, and validate the answer to authenticate the wireless user device based on the user ID.

13. The wireless communication network of claim 11 wherein the network authentication circuitry is configured to transfer the circuitry ID to another data communication device associated with the user ID and receive an authentication instruction from the other data communication device to authenticate the wireless user device based on the user ID, wherein the other data communication device is configured to authenticate the wireless user device based on the circuitry ID to transfer the authentication instruction.

14. The wireless communication network of claim 11 wherein:

the network access circuitry is further configured to identify a digital certificate in the decrypted access data; and the network access circuitry is configured to establish the secure data tunnel and transfer the authentication request in response to validating the digital certificate in the decrypted access data to establish the secure data tunnel and transfer the authentication request.

15. The wireless communication network of claim 11 wherein:

the network access circuitry is further configured to identify a random number in the decrypted access data; and the network access circuitry is configured to establish the secure data tunnel and transfer the authentication request in response to identifying the random number in the decrypted access data to establish the secure data tunnel and transfer the authentication request.

16. The wireless communication network of claim 11 wherein the network authentication circuitry comprises at least one of a Uniform Data Management (UDM) and a Uniform Data Repository (UDR) configured to store the user ID, the circuitry ID, the network ID, and the user key in association with one another.

17. The wireless communication network of claim 11 wherein the network access circuitry comprises a non-Third Generation Partnership Project Interworking Function (non-3GPP IWF).

18. The wireless communication network of claim 11 wherein the network authentication circuitry comprises a Third Generation Partnership Project Access and Mobility Management Function (3GPP AMF) and a Third Generation Partnership Project Authentication and Security Function (3GPP AUSF).

19. The wireless communication network of claim 11 wherein:

the user ID comprises a Subscriber Permanent Identifier (SUPI);

the user key comprises a Third Generation Partnership Project (3GPP) Key (K); and the circuitry ID comprises a Central Processing Unit (CPU) serial number.

20. A method comprising:

network access circuitry receiving encrypted access data that was encrypted by a first wireless user device with an initial network key, decrypting the encrypted access data with an initial paired key, and identifying a network ID and the circuitry ID in the decrypted access data, and in response to decrypting the encrypted access data, establishing a secure data tunnel with the first wireless user device and transferring an authentication request indicating the circuitry ID for the first wireless user device to network authentication circuitry;

the network authentication circuitry receiving the authentication request, identifying a user ID based on the circuitry ID, transferring a challenge to a second wireless user device associated with the user ID, receiving an answer from the second wireless user device in response to the challenge, and validating the answer to authenticate the first wireless user device, and in response to authentication of the first wireless user device, generating a new network key and a new paired key for the first wireless user device to replace the initial network key and initial paired key and transferring an authentication notice for the first wireless user device to the network access circuitry that indicates the new network key, the new paired key, and a user key grant; and the network access circuitry receiving the authentication notice and transferring the new network key and the user key grant to the first wireless user device over the secure data tunnel, wherein the first wireless user device uses the user key grant to unlock a user key, uses the user key to securely communicate with the wireless communication network for a current data session, and after termination of the current data session, uses the new network key to subsequently encrypt and transfer the access data to the network access circuitry for a subsequent data session.

* * * * *